United States Patent [19]

Huseby et al.

[11] 4,413,062

[45] Nov. 1, 1983

[54] MOLDING COMPOSITION AND PRODUCT PRODUCED THEREFROM

[75] Inventors: Irvin C. Huseby; Jan W. Szymaszek, both of Schenectady, N.Y.; Eldon B. Heft, West Hartford, Conn.

[73] Assignee: General Electric Company, Schenectady, N.Y.

[21] Appl. No.: 382,848

[22] Filed: May 27, 1982

Related U.S. Application Data

[63] Continuation-in-part of Ser. No. 284,867, Jul. 20, 1981, abandoned.

[51] Int. Cl.³ .............................................. C04B 35/16
[52] U.S. Cl. .................................... 501/123; 501/154
[58] Field of Search .................. 106/85; 501/111, 123, 501/154

[56] References Cited

U.S. PATENT DOCUMENTS 2,366,485  1/1945  Brink et al. ............................ 106/85
2,687,967  8/1954  Yedlick ................................ 501/154
2,704,381  3/1955  Nelson ................................. 18/47.5

OTHER PUBLICATIONS

"A Quick Setting Silico-Phosphate Cement", by Richard J. Janowiecki and Charles E. Semler, Monsanto Research Corporation, Dayton Laboratory, Dayton, Ohio 45407, Jan. 1971, Final Report, Phase II, Report No. FH-11-7321, (MRC-DA-275), pp.: Front, iii-xi, 1,5,10,12,25,29,30,41,61,62, and 110.

"A Quick-Setting Wollastonite Phosphate Cement," Semler, C. E., Ceramic Bulletin, vol. 55, No. 11, (1976), pp. 983-985, 988.

Primary Examiner—James Poer
Attorney, Agent, or Firm—Jane M. Binkowski; James C. Davis, Jr.; James Magee, Jr.

[57] ABSTRACT

A ceramic useful as an electrically insulating material is produced by calcining wollastonite powder, admixing the calcined powder with phosphoric acid of certain $P_2O_5$ concentration range, die-pressing the resulting mixture, and firing the resulting pressed piece.

10 Claims, 1 Drawing Figure

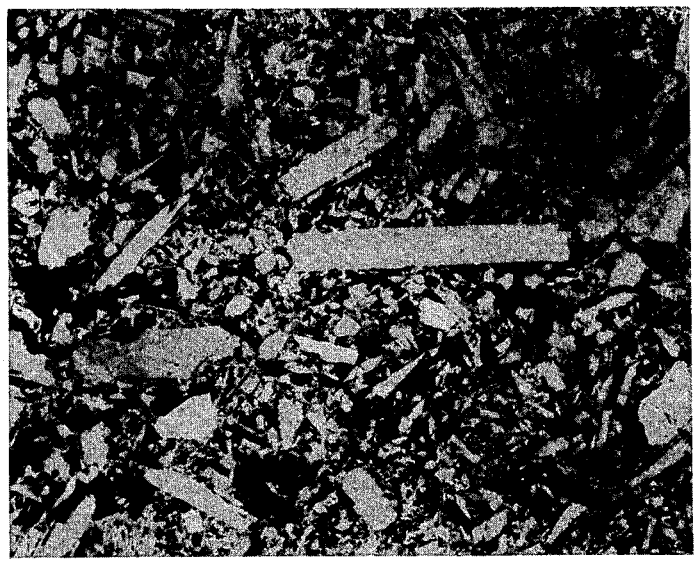

MOLDING COMPOSITION AND PRODUCT PRODUCED THEREFROM

This is a continuation-in-part of copending Ser. No. 284,867 filed July 20, 1981 now abandoned.

The present invention relates to molding compositions of wollastonite and phosphoric acid and to the fired products produced therefrom. The fired products are useful as electrically insulating materials, particularly electrically insulating materials for arc chutes of arc circuit breakers and other high temperature applications.

Report FH-11-7321 entitled "A Quick Setting Silico-Phosphate Cement" prepared for the Office of Research, Department of Transportation, Federal Highway Administration, Washington, D.C., and reproduced by the National Technical Information Service discloses a cold-setting cement for repair of concrete pavements utilizing calcined wollastonite and phosphoric acid wherein the acid contains metal ions such as zinc, aluminum and magnesium to develop hardness or strength.

C. E. Semler, "A Quick-Setting Wollastonite Phosphate Cement," Ceramics Bulletin, Volume 55, No. 11, pages 983-988 (1976) discloses a cold-setting cement utilizing wollastonite and phosphoric acid containing metal ions such as zinc, aluminum and magnesium.

Presently, insulating materials useful for high temperature applications contain asbestos. For example, the high temperature insulating material of U.S. Pat. No. 2,366,485 to Brink et al. incorporated herein by reference discloses a thermoset molded product produced by reacting under heat and pressure a reaction mixture of chrysotile asbestos fibers and ortho-phosphoric acid of a concentration exceeding 60%. However, medical evidence has indicated that asbestos is a health hazard. The present invention provides a substitute for asbestos-containing insulating materials.

The fired products of the present invention have a number of uses, but they are especially useful as electrically insulating materials, particularly for arc chutes of arc circuit breakers.

The present invention will be better understood from the following description taken in connection with the accompanying FIGURE which is a photomicrograph (magnified 200 times) illustrating the microstructure of the present fired body.

Briefly stated, the process of the present invention comprises calcining wollastonite powder to produce a calcined powder at least significantly free of calcite, admixing from about 18 parts by weight to about 42 parts by weight of phosphoric acid per about 100 parts by weight of said calcined wollastonite, said phosphoric acid ranging in concentration of $P_2O_5$ from about 61% by weight to about 76% by weight of the total weight of said acid, die-pressing the resulting mixture to impart at least sufficient green strength to the pressed piece to allow its removal from the press, and firing the pressed piece in air at atmospheric pressure at a temperature ranging from about 500° C. to about 900° C. to produce a fired product having a porosity less than 50% by volume but greater than 10% by volume of the total volume of the fired product.

The present molding composition is comprised of at least a significantly uniform mixture of from about 15% by weight to about 30% by weight of phosphoric acid and from about 70% by weight to about 85% by weight of calcined wollastonite, said phosphoric acid ranging in concentration of $P_2O_5$ from about 61% by weight to about 76% by weight of the total weight of said acid, said calcined wollastonite being at least significantly free of calcite.

In the present invention, a firing temperature of from about 500° C. up to about 600° C. produces a product comprised of at least two phases, i.e. wollastonite and α-cristobalite, and for a given composition, the volume fraction of α-cristobalite increases with increasing firing temperature. In this embodiment, the present polycrystalline ceramic body is comprised of wollastonite and α-cristobalite, said ceramic body having a porosity ranging from less than about 50% by volume to greater than about 10% by volume of the total volume of said ceramic body, said wollastonite phase being in the form of particles distributed throughout said body and being identifiable as calcium metasilicate, said wollastonite phase being present in an amount greater than 70% by volume but less than about 98% by volume of the total volume of the solid portion of said body, said α-cristobalite phase being present in an amount less than about 15% by volume of the total volume of the solid portion of said body.

In the present invention, a firing temperature of from about 600° C. to about 900° C. produces a product comprised of at least three phases, i.e. wollastonite, α-cristobalite and β-calcium pyrophosphate. The β-calcium pyrophosphate is frequently detectable in products produced at 600° C. by Diffractometer X-ray Diffraction Analysis, and it is always detectable in products produced at firing temperatures higher than 600° C. For a given composition, the volume fraction of β-calcium pyrophosphate increases with increasing firing temperature. In this embodiment, the present polycrystalline ceramic body is comprised of a major phase of wollastonite and at least two minor phases, one of said minor phases being β-calcium pyrophosphate ($\beta$-$Ca_2P_2O_7$), the other of said minor phases being α-cristobalite ($SiO_2$), said ceramic body having a porosity ranging from less than about 50% by volume to greater than about 10% by volume of the total volume of said ceramic body, said wollastonite phase being in the form of particles distributed throughout said body and being identifiable as calcium metasilicate ($CaSiO_3$), said wollastonite phase being present in an amount greater than 50% by volume but less than about 95% by volume of the total volume of the solid portion of said body, said β-calcium phosphate minor phase being present in an amount less than about 40% by volume of the total volume of the solid portion of said body, said α-cristobalite phase being present in an amount less than about 25% by volume of the total volume of the solid portion of said body.

Wollastonite is a naturally occurring, white, non-metallic mineral identified chemically as calcium metasilicate, $CaSiO_3$, which melts at a temperature of 1540° C. As produced or available commercially, wollastonite powder contains small amounts of calcite ($CaCO_3$), traces of oxides such as $Fe_2O_3$ and perhaps traces of other minerals such as diopside $CaMg(Si_2O_6)$. Wollastonite is an inexpensive mineral that is mined and sold in the form of acicular particles, i.e. its crystalline shape is acicular, in a range of sizes and aspect ratios. Generally, commercially available wollastonite powder ranges in aspect ratio from about 20 to about 3 and has an average specific surface as measured by BET of from about 0.3 $m^2/g$ to about 2.5 $m^2/g$. Wollastonite particles are probably quite strong along a direction parallel to their long axis, and thereby can be a strengthening agent in the present product. Commercially available wollastonite powder ranging in aspect ratio from about 3 to 5 having an average specific surface as measured by BET of from about 1.5 to about 1.9 m²/g is preferred since it produces a fired product with an especially high modulus of rupture in the present invention. If desired, however, the wollastonite powder can be comminuted by a number of conventional techniques to produce a powder of the desired size. The wollastonite particles or powder used in the present invention can range widely in size, with the particular size and size distribution depending largely on the particular type of fired product desired.

In carrying out the present process, the wollastonite particles or powder is calcined in air at atmospheric pressure to produce a calcined powder which is at least significantly free of calcite. During calcining, the calcite ($CaCO_3$) thermally decomposes to calcium oxide (CaO) and carbon dioxide gas ($CO_2$), the evolution of which removes a source of gas evolution during firing in the present process and allows the production of the present product. Calcination can be carried out at a temperature ranging from about 800° C. to about 1100° C., and preferably, from about 900° C. to about 1000° C. Temperatures lower than about 800° C. would not be sufficient to decompose the calcite, whereas temperatures higher than about 1100° C. provide no significant advantage. The period of time required for calcining is determinable empirically, generally ranging from about 15 minutes to about 3 hours, and depending largely on such factors as calcining temperature, with lower calcining temperatures requiring longer periods of time, the amount of powder being calcined, and the extent to which the calcite must be removed. Calcining of the wollastonite powder at about 1000° C. for about one hour is preferred since such calcination insures the production of a powder which is free or significantly free of calcite. By a calcined powder which is significantly free of calcite, it is meant one which will allow the production of the present fired product. Ordinarily, the present calcined wollastonite powder does not contain calcite in an amount which is determinable by Diffractometer X-ray Diffraction Analysis.

One technique of determining that the calcined powder is at least significantly free of calcite is by its weight loss during calcination. Calcination at 1000° C. for one hour in air of a series of commercially available powders showed a weight loss ranging from about 0.6 weight % to about 2.1 weight %. When additional calcination of a calcined wollastonite powder produces no significant weight loss, such a powder is free, or at least significantly free of calcite. The calcined powder is a flowable powder with a specific surface area usually significantly lower than that of the starting noncalcined powder.

The phosphoric acid used in the present process consists essentially of water and $P_2O_5$, i.e. it is formed by the reaction of water and $P_2O_5$. Specifically, it is a viscous liquid wherein the concentration of $P_2O_5$ ranges from about 61% by weight to about 76% by weight, and preferably about 70% by weight, of the total weight of the acid. Phosphoric acid having a $P_2O_5$ concentration of less than about 61% by weight is not effective. On the other hand, a phosphoric acid with a $P_2O_5$ concentration higher than about 76% by weight is likely to be too viscous to be useful. Since preferably commercially available phosphoric acid does not have the required concentration of $P_2O_5$, it can be boiled, typically at a temperature of about 215° C., to produce the present acid. The specific $P_2O_5$ concentration of the acid is determinable by measuring specific gravity. Alternatively, a highly concentrated phosphoric acid can be purchased and admixed with a less concentrated phosphoric acid to produce the present phosphoric acid.

The present molding composition, i.e. the reaction mixture pressed in the die press, is comprised of from about 18 parts by weight to about 42 parts by weight of the phosphoric acid per 100 parts by weight of the calcined wollastonite. In terms of weight ratio, the present molding composition or mixture is comprised of from about 15% by weight to about 30% by weight of phosphoric acid and from about 70% by weight to about 85% by weight of the calcined wollastonite. Phosphoric acid in an amount less than about 15% by weight of the mixture probably will not develop sufficient green strength to allow the pressed piece to be removed from the die press, or it will produce a fired product which is too weak to be useful. On the other hand, phosphoric acid in an amount greater than about 30% by weight of the mixture reduces the strength or modulus of rupture of the fired product substantially.

The particular amount of phosphoric acid used to produce the present molding composition depends largely on the size and size distribution of the calcined wollastonite powder. The smaller the size of the wollastonite particles, the larger is its surface area and the greater is the amount of phosphoric acid needed to react with the larger surface area to produce the present fired product. The particular amount of phosphoric acid of particular concentration used is determinable empirically. For example, the amount of phosphoric acid of given concentration can be optimized for fired strength, i.e. the strength of the fired product, for example its modulus of rupture, is measured in a series of runs from which the optimum amount of phosphoric acid is determined in order to produce a product having a particular fired strength. Preferably, for production of high strength fired products, the molding composition is comprised of about 76% by weight calcined wollastonite and about 24% by weight phosphoric acid wherein the concentration of $P_2O_5$ is about 70% by weight.

In forming the present molding composition, the phosphoric acid and calcined wollastonite powder are mixed to produce at least a significantly uniform mixture. Mixing can be carried out by a number of conventional techniques.

The molding composition, i.e. mixture of phosphoric acid and calcined wollastonite powder, is placed in a mold or die and pressed to produce a pressed, i.e. molded, green piece with at least sufficient strength to allow its removal from the press. Normally, such a removable pressed green piece would have a modulus of rupture (MOR) at room temperature greater than 20 psi using a 3-point bend apparatus and a sample of 5 inch span length, 1½ inches wide and about ⅜ inch thick. The applied pressure is determinable empirically and can range widely, for example, from about 500 psi to about 10,000 psi or higher depending largely on the strength desired in the green piece and fired product, as well as the size of the press. Steel dies that are plated with chromium are preferred. The higher the applied pressure, the higher is the strength of the pressed green piece and that of the resulting fired product. Ordinarily, an applied pressure ranging from about 4000 psi to about 6000 psi produces a suitable green pressed piece.

If desired, heat can be applied during pressing to increase green strength and such applied heat is determinable empirically, but generally, it is less than about 500° C. Usually, if the green piece to be produced by die pressing is of complex and/or hollow shape, it is necessary to carry out the pressing procedure under applied heat as well as pressure to impart the necessary green strength to the pressed or molded piece to allow its removal from the press. Such applied heat is determinable empirically. As a practical matter, an applied temperature ranging up to about 110° C. is satisfactory, provided, preferably, by a steam heated steel die-press.

The resulting pressed or molded green piece can be fired directly to produce the present fired body or product. However, if the green piece is to be machined, it ordinarily is dried to increase its strength sufficiently to allow the desired machining. Drying of the green piece can be carried out by a number of conventional techniques such as, for example, drying in air at room temperature or at an elevated temperature, typically about 150° C.

The green piece or body is fired in air at atmospheric or about atmospheric pressure at a firing temperature ranging from about 500° C. to about 900° C., preferably about 600° C. to about 900° C., to produce the present fired product. A firing temperature of about 800° C. is most preferred since it generally produces the strongest product when all other parameters are equal. The particular firing time period depends largely on the size of the green piece and on firing temperature and is determinable empirically, i.e. the higher the firing temperature the shorter the firing time and the larger the green piece the longer the time. A firing temperature lower than about 500° C. produces a product which is too weak to be useful or is not useful as an electrically insulating material. On the other hand, a firing temperature higher than about 900° C. provides no advantage and may weaken the product. Preferably, firing is carried out at a temperature of about 800° C. for about 2 hours.

During firing at about 600° C. and higher, apparently a surface portion of the wollastonite particle reacts with the phosphoric acid to produce $\beta$-calcium phosphate and cristobalite as shown by the following reaction:

$$2CaSiO_3 + 2H_3PO_4 \rightarrow 3H_2O_{(g)} + Ca_2P_2O_7 + 2SiO_2.$$

As the fired product cools, i.e. at about 200° C., the $\beta$-cristobalite ($SiO_2$) transforms to $\alpha$-cristobalite ($SiO_2$).

The present fired product can vary widely in size, form and shape, as desired. It can be simple in shape, or it can be of complex and/or hollow shape. Linear shrinkage from the pressed green piece, whether dried or not, to the fired product is less than 3 percent. Linear shrinkage $\Delta L/L_o$ is the difference in length between the pressed green piece and the fired body, $\Delta L$, divided by the length of the green piece $L_o$.

The present fired product or body has a porosity less than about 50% by volume and greater than about 10% by volume of the total volume of the fired product. Porosity is the % by volume of the fired body occupied by voids, i.e. pores, and can be determined by liquid displacement and/or metallographic procedures. The pores are distributed throughout the fired product, and, generally, greater than 90% by volume of the pores are interconnected. The lower the porosity of the fired product, the greater is its modulus of rupture.

The present fired product is an opaque polycrystalline ceramic usually white or grey in color. The wollastonite phase is in the form of particles distributed throughout the fired product. If the starting calcined wollastonite powder is in the form of acicular particles, it is also in the form of acicular particles in the fired product. If the starting wollastonite powder contains diopside in a detectable amount, the fired product also will contain diopside in a detectable amount.

The preferred embodiment of the present product is comprised of a major phase of wollastonite, i.e. calcium metasilicate ($CaSiO_3$), and at least two minor phases, one of the minor phases being $\beta$-calcium pyrophosphate ($Ca_2P_2O_7$) and the other being $\alpha$-cristobolite ($SiO_2$). In this preferred embodiment, based on the total volume of the solid portion of the fired product, the wollastonite phase is present in an amount greater than 50% by volume but less than 95% by volume, the $\beta$-$Ca_2P_2O_7$ phase present ranges from a detectable amount, typically an amount detectable by Diffractometer X-ray Diffraction Analysis, to an amount less than about 40% by volume, and the $\alpha$-cristobalite phase present ranges from a detectable amount, typically an amount detectable by Diffractometer X-ray Diffraction Analysis, to an amount less than about 25% by volume.

The present fired product has an average modulus of rupture (MOR) at room temperature greater than 2000 psi, and generally greater than 3000 psi, using a 3-point bend apparatus and a sample of the fired product of 5 inch span length, 1½ inches wide and about ⅜ inch thick.

The present fired product is useful as an electrically insulating material. Specifically, it is useful as an electrically insulating material in arc chutes used in arc circuit breakers, as electrical contactors for resistor heater mounts, as rheostat frames and as electrical spacers.

The invention is further illustrated by the following examples wherein the procedure was as follows unless otherwise stated:

All of the wollastonite powders used had a melting point of 1540° C.

Surface area was measured by the conventional Brunauer, Emmet and Teller (BET) gas adsorption technique.

Aspect ratio is L/D.

F-1 wollastonite powder is sold under the trademark NYADG ®. It is white, acicular in shape with an aspect ratio of 20:1, a surface area of 0.32 m²/gm, and a typical chemical composition as follows:

| | Chemical Composition CaSiO₃ | |
| --- | --- | --- |
| Component | Typical | Theoretical |
| CaO | 47.0% | 48.30% |
| SiO₂ | 50.0 | 51.70 |
| Fe₂O₃ | 1.0 | |
| Al₂O₃ | 1.0 | |
| MnO | 0.1 | |
| MgO | 0.3 | |
| TiO₂ | 0.05 | |
| Moisture % (After 24 hr at 110° C.) | 0.2 | |
| Loss on ignition (% volatile at 1000° C.) | 1.0 | |

P-1 is sold under the trademark NYAD ® 325, has an aspect ratio of 5:1 and a surface area of 1.96 m²/gm. P-4 is sold under the trademark NYAD ® 400, has an aspect ratio of 3:1 and a surface area of 2.00 m²/gm. Both powders are white, acicular in crystalline shape and have the following typical chemical composition:

| Chemical Composition CaSiO₃ | | |
|---|---|---|
| Component | Typical | Theoretical |
| CaO | 47.0% | 48.30% |
| SiO₂ | 50.0 | 41.70 |
| FeO | 0.5 | |
| Al₂O₃ | 1.0 | |
| MnO | 0.1 | |
| MgO | 0.2 | |
| TiO₂ | 0.05 | |
| Moisture | 0.90 | |

The W-10, W-20 and W-30 powders, sold under the trademark Vansil ®, have a crystalline shape which is acicular and have the following typical chemical analysis:

| | |
|---|---|
| Calcium oxide (CaO) | 46.1 |
| Silicon dioxide (SiO₂) | 50.2 |
| Aluminum oxide (Al₂O₃) | 0.21 |
| Magnesium oxide (MgO) | 1.86 |
| Iron oxide (Fe₂O₃) | 0.15 |
| Sodium oxide (Na₂O) | 0.22 |
| Ignition loss | 0.94 |
| Total | 99.68 |

The mineralogy of the W-10, W-20 and W-30 powders is as follows:

| | |
|---|---|
| Wollastonite | Major |
| Calcite (CaCO₃) | Minor |
| Diopside [CaMg(Si₂O₆)] | Trace |

The median particle size of W-10 is 18.5μ, of W-20 is 9.6μ and of W-30 is 6.1μ.

Calcining was carried out in air at atmospheric pressure at the given temperature for 60 minutes.

70 weight % P₂O₅ phosphoric acid (by boiling) was produced by boiling analytical grade 85% orthophosphoric acid (which contains 62 weight % P₂O₅) at 215° C. to a specific gravity of 1.83 thereby evaporating water until the acid concentrated to 70 weight percent P₂O₅.

Hand mixing—batch composition, i.e., mixture, was kneaded in a dish for 5 minutes with a pestle by hand.

Hobart mixing—mixture placed in stainless steel bowl and mechanically mixed 4 minutes with a paddle mixer and 2 minutes with a whip mixer.

Sigma mixing—a 5 quart Tangentional Blade Sigma Mixer used in Example 33. All other Sigma mechanical mixing carried out with a 1 quart Double Arm overlapping Signma mixer. Mixing time given.

Mixing resulted in at least a significantly uniform mixture unless otherwise noted.

Ice—during mixing the dish or bowl was sitting on an ice bath.

Screening—after mixing, the mixture is passed through a 10 mesh Tyler brass screen.

All sectioning was carried out with samples in the dried out condition. The liners were sectioned with a band saw, all other samples were sectioned with a dry SiC cut-off wheel.

Prior to pressing, the die and face plates were coated with a die release agent. A chrome-plated steel die press was used. All of the pressed pieces had sufficient green strength to allow their removal of the press.

Firing was carried out in an air furnace in air at atmospheric pressure. At the end of each firing run, the power was switched off and the fired body was furnace-cooled to room temperature.

The fired bodies were evaluated by physical and metallographic procedures and by arc resistance tests.

MOR is Modulus of Rupture and is the average of the given fired pieces of the given span size measured with a 3-point bend apparatus in air at room temperature. Specifically, where the given span size is 2 inches, the sample length was 3 inches and the sample width was ⅜ inch. Where the given span size is 5 inches, the sample length was 6 inches and the sample width was 1¼ inches. All the samples were about ⅜ inch thick. The ± value for MOR is one standard deviation.

| | | Calcining | | | Batch Composition | | | | | Die-Press Molding | | |
|---|---|---|---|---|---|---|---|---|---|---|---|---|
| Ex. No. | Wollas-tonite Powder | 60 Minutes Temp. (°C.) | Wt. Loss (%) | Phosphoric Acid P₂O₅ wt. % Conc. | Calcined Wollas-tonite (grams) | Phosphoric Acid (grams) | No. of Batches | Mixing Procedure | Screening | Pressure (psi) | Time (min) | Temp. (°C.) |
| 1 | F-1 | 1000 | 0.76 | 70% (by boiling) | 100 | 24 | 4 | Hand-ice | No | 6000 | 3 | Room Temp. |
| 2 | " | " | " | 70% (by boiling) | 100 | 26 | 4 | " | " | " | " | Room Temp. |
| 3 | " | " | " | 70% (by boiling) | 100 | 28 | 4 | " | " | " | " | Room Temp. |
| 4 | " | " | " | 70% (by boiling) | 100 | 30 | 4 | " | " | " | " | Room Temp. |
| 5 | W-10 | " | 1.66 | 70% (by boiling) | 100 | 28 | 4 | " | " | " | " | Room Temp. |
| 6 | " | " | " | 70% (by boiling) | 100 | 30 | 4 | " | " | " | " | Room Temp. |
| 7 | " | " | " | 70% (by boiling) | 100 | 32 | 4 | " | " | " | " | Room Temp. |
| 8 | P-1 | 900 | 0.63 | 70% (by boiling) | 100 | 36 | 4 | " | " | " | " | Room Temp. |
| 9 | P-4 | 950 | 0.66 | 70% (by boiling) | 100 | 36 | 4 | " | " | " | " | Room Temp. |
| 10 | W-10 | 1000 | 1.66 | 70% (by boiling) | 200 | 54 | 3 | Hobart-ice | " | " | " | Room Temp. |
| 11 | W-10 | 1000 | 1.66 | 70% (by boiling) | 200 | 64 | 8 | Hobart-ice | No | 4200 | 3 | Room Temp. |
| 12 | " | " | " | 70% (by boiling) | 150 | 48 | 3 | Hand-ice | " | 6000 | " | Room Temp. |
| 13 | W-20 | 950 | 1.38 | 70% (by boiling) | 250 | 90 | 2 | Hobart-ice | " | " | " | Room Temp. |

-continued

| | | | | | | | | | | | | |
|---|---|---|---|---|---|---|---|---|---|---|---|---|
| 14 | W-30 | " | 2.111 | " (by boiling) | 70% | " | " | 2 | " | " | " | Room Temp. |
| 15 | " | " | " | 70% (by boiling) | 100 | 36 | 4 | Hand-ice | " | " | " | Room Temp. |
| 16 | W-10 | 1000 | 1.66 | 70% (by boiling) | 250 | 80 | 1 | Hobart-no ice | Yes | " | " | Room Temp. |
| 17 | " | " | " | 70% (by boiling) | " | " | 1 | Hobart-no ice | No | " | " | Room Temp. |
| 18 | " | " | " | 70% (by boiling) | " | " | 1 | Hobart-ice | " | " | " | Room Temp. |
| 19 | " | " | " | 70% (by boiling) | " | " | 1 | " | Yes | " | " | Room Temp. |
| 20 | " | " | " | 70% (by boiling) | 100 | 32 | 2 | Hand-no ice | No | " | " | Room Temp. |
| 21 | " | " | " | 70% (by boiling) | " | " | 2 | Hand-no ice | Yes | " | " | Room Temp. |
| 22 | " | " | " | 70% (by boiling) | " | " | 2 | Hand-ice | " | " | " | Room Temp. |
| 23 | " | " | " | 70% (by boiling) | " | " | 2 | " | No | " | " | Room Temp. |
| 24 | " | " | " | 70% (by boiling) | " | " | 4 | Hand-no ice | " | " | " | Room Temp. |
| 25 | W-10 | 1000 | 1.66 | 62% (not boiled) | 100 | 32 | 2 | Hand-no Ice | No | 6000 | 3 | Room Temp. |
| 26 | " | Not calcined | " | 70% (by boiling) | " | " | 3 | Hand-no ice | " | " | " | Room Temp. |
| 27 | " | 1000 | " | 70% (by boiling) | 350 | 112 | 1 | Sigma (4 min.) | Yes | " | " | Room Temp. |
| 28 | " | " | " | 70% (by boiling) | " | " | 1 | Sigma (6 min.) | " | " | " | Room Temp. |
| 29 | " | " | " | 70% (by boiling) | " | " | 1 | Sigma (12 min.) | " | " | " | Room Temp. |
| 30 | " | " | " | 70% (by boiling) | " | " | 1 | Sigma (18 min.) | " | " | " | Room Temp. |
| 31 | " | " | " | 70% (by boiling) | " | " | 1 | Sigma (6 min.) | No | " | " | Room Temp. |
| 32 | " | " | " | 70% (by boiling) | 1200 | 384 | 1 | Sigma (12 min.) | Yes | " | " | Room Temp. |
| 33 | " | " | " | 70% mixed 85% & 105% ortho-phosphoric acid | 350 | 112 | 1 | Sigma (6 min.) | " | " | " | Room Temp. |
| 34 | " | " | " | 70% (by boiling) | 100 | 32 | 2 | Hand-no ice | " | " | " | Room Temp. |
| 35 | " | " | " | 70% (by boiling) | " | " | 2 | Hand-no ice | " | " | " | Room Temp. |
| 36 | " | " | " | 70% (by boiling) | " | " | 1 | Hand-no ice | No | " | 2 | 106° C. |
| 37 | " | " | " | 70% (by boiling) | " | " | 1 | Hand-no ice | " | " | 4 | " |

| Ex. No. | Molded Green Piece | | Dried for 24 Hrs. | | Dried Pieces Sectioned | | Firing for 2 Hours in Air | | | Fired Product | | |
|---|---|---|---|---|---|---|---|---|---|---|---|---|
| | No. | Size (inches) | Temp. (°C.) | Wt. Loss (%) | No. | Size of Section (inch) | Temp. °C. | Green Sections or Pieces | Wt. Loss (%) | MOR (psi) | Std. ± Dev. | (Span/Length) |
| 1 | 4 | 6 × 1½ × ⅜ | 150 | 2.8 | 16 | 3 × ¾ × ⅜ | 500 | 4 | — | 3069 ± 347 | — | (2) |
| | | | | | | | 600 | 4 | — | 4250 ± 378 | — | (2) |
| | | | | | | | 700 | 4 | — | 5121 ± 353 | — | (2) |
| | | | | | | | 800 | 4 | — | 4884 ± 337 | — | (2) |
| 2 | " | " | " | 3.0 | " | " | 500 | 4 | — | 3460 ± 344 | — | (2) |
| | | | | | | | 600 | 4 | — | 4580 ± 271 | — | (2) |
| | | | | | | | 700 | 4 | — | 5116 ± 380 | — | (2) |
| | | | | | | | 800 | 4 | — | 5219 ± 478 | — | (2) |
| 3 | " | " | " | 3.6 | " | " | 500 | 4 | — | 2507 ± 233 | — | (2) |
| | | | | | | | 600 | 4 | — | 3063 ± 63 | — | (2) |
| | | | | | | | 700 | 4 | — | 3797 ± 222 | — | (2) |
| | | | | | | | 800 | 4 | — | 3926 ± 519 | — | (2) |
| 4 | " | " | " | 4.0 | " | " | 500 | 4 | — | 2498 ± 560 | — | (2) |
| | | | | | | | 700 | 4 | — | 4749 ± 570 | — | (2) |
| | | | | | | | 900 | 4 | — | 2805 ± 135 | — | (2) |
| 5 | " | " | " | 3.1 | " | " | 500 | 4 | — | 5011 ± 421 | — | (2) |
| | | | | | | | 600 | 4 | — | 5938 ± 416 | — | (2) |
| | | | | | | | 700 | 4 | 3.5 | 5649 ± 460 | — | (2) |
| | | | | | | | 800 | 4 | 3.5 | 5314 ± 428 | — | (2) |
| 6 | " | " | " | 3.2 | " | " | 500 | 4 | — | 5164 ± 299 | — | (2) |
| | | | | | | | 600 | 4 | — | 6391 ± 269 | — | (2) |
| | | | | | | | 700 | 4 | — | 5981 ± 40 | — | (2) |
| | | | | | | | 800 | 4 | — | 5815 ± 240 | — | (2) |
| 7 | " | " | " | 3.6 | " | " | 500 | 4 | — | 4738 ± 325 | — | (2) |

-continued

| | | | | | | | | | | | |
|---|---|---|---|---|---|---|---|---|---|---|---|
| | | | | | | | 600 | 4 | — | 6062 ± 144 — | (2) |
| | | | | | | | 700 | 4 | 4.1 | 6417 ± 194 — | (2) |
| | | | | | | | 800 | 4 | 4.1 | 6461 ± 134 — | (2) |
| 8 | " | " | " | 3.7 (0.18 shrinkage) | " | " | 500 | 4 | — | 4098 ± 370 — | (2) |
| | | | | | | | 600 | 4 | — | 4725 ± 188 — | (2) |
| | | | | | | | 700 | 4 | — | 4941 ± 388 — | (2) |
| | | | | | | | 800 | 4 | — | 4871 ± 238 — | (2) |
| (9) | " | " | " | 3.6 (0.16% shrinkage) | " | " | 500 | 4 | — | — | 4327 ± 185 — |
| | | | | | | | 600 | 4 | — | 4712 ± 200 — | (2) |
| | | | | | | | 700 | 4 | — | 4475 ± 200 — | (2) |
| | | | | | | | 800 | 4 | — | 4766 ± 72 — | (2) |
| 10 | 47 | T-bars | " | 3.1 | | Not Sectioned | 800 | 47 | 5.8 | — | |
| 11 | ~8 6 × ¼ thick | disc | 150 | — | 8 | Liners | 800 | 8 | 4.6 | — | |
| 12 | 12 | 6 × 1½ × ⅜ | " | 3.6 | 24 | 2 11/16 × 1½ × ⅜ (Divider) | " | 24 | 5.2 | — | |
| 13 | 2 | 6⅜ × 3 × 7/16 | " | — | 16 | 3 × ¾ × 7/16 | 500 | 4 | — | 3101 ± 1215 — | (2) |
| | | | | | | | 600 | 4 | — | 4068 ± 618 — | (2) |
| | | | | | | | .700 | 4 | — | 4532 ± 55 — | (2) |
| | | | | | | | 800 | 4 | — | 4884 ± 137 — | (2) |
| 14 | " | " | " | — | " | " | 500 | 4 | — | 2840 ± 1078 — | (2) |
| | | | | | | | 600 | 4 | — | 2638 ± 1290 — | (2) |
| | | | | | | | 700 | 4 | — | 3475 ± 586 — | (2) |
| | | | | | | | 800 | 4 | — | 3012 ± 1152 — | (2) |
| 15 | 4 | 6 × 1½ × ⅜ | " | — | " | 3 × ¾ × ⅜ | 500 | 4 | — | 1818 ± 1124 — | (2) |
| | | | | | | | 600 | 4 | — | 1160 ± 311 — | (2) |
| | | | | | | | 700 | 4 | — | 1870 ± 973 — | (2) |
| | | | | | | | 800 | 4 | — | 3396 ± 1584 — | (2) |
| 16 | 2 | " | " | — | | Not Sectioned | 800 | 2 | 3.9 | 5090 — | (5) |
| 17 | " | " | " | — | | " | " | 2 | 4.0 | 4235 — | (5) |
| 18 | " | " | " | — | | " | " | 2 | 3.7 | 3675 — | (5) |
| 19 | " | " | " | — | | " | " | 2 | 3.7 | 4313 — | (5) |
| 20 | " | " | " | 3.4 | | " | 800 | 2 | 4.4 | 5760 — | (5) |
| 21 | " | " | " | 4.3 | | " | " | 2 | 4.1 | 4967 — | (5) |
| 22 | " | " | " | 3.9 | | " | " | 2 | 4.3 | 5058 — | (5) |
| 23 | " | " | " | 3.7 | | " | " | 2 | 4.2 | 4595 — | (5) |
| 24 | 4 | " | " | — | | " | 800 | 4 | — | Samples boiled 2 hrs. in H₂O - then dried out 3 hrs. @ 146° C. in house vacuum. 4605 ± 324 — | (5) |
| (25) | 2 | 6 × 1½ × ⅜ | 150 | 5.6 | | Not Sectioned | 800 | 2 | 3.4 | 4393 | — |
| 26 | 3 | " | " | — | | " | 800 | 3 | | 2920 ± 126 — | (5) |
| 27 | " | " | " | — | | " | 800 | " | | 6212 ± 62 — | (5) |
| 28 | " | " | " | — | | " | 800 | " | | 7033 ± 129 — | (5) |
| 29 | " | " | " | — | | " | 800 | " | | 6205 ± 128 — | (5) |
| 30 | " | " | " | — | | " | 800 | " | | 5809 ± 239 — | (5) |
| 31 | " | " | " | — | | " | 800 | " | | 4848 ± 885 | |
| 32 | 12 | " | " (3 not dried) | — | | " | 800 | 3 3 3 | | 5010 ± 236 — 4811 ± 206 — 4794 ± 83 — | (5) (5) (5) |
| 33 | 3 | " | 150 | — | | " | 800 | 3 | | 5789 ± 466 — | (5) |
| 34 | 2 | " | Not dried out | — | | " | Not fired | 2 | | 56 — | (5) |
| 35 | 2 | " | Not dried out | — | | " | Not fired | 2 | | 84 | (5) |
| 36 | 1 | " | Not dried out | — | | " | Not fired | 1 | | 324 — | (5) |
| 37 | 1 | " | Not dried out | — | | " | Not fired | 1 | | 413 — | (5) |

All of the tabulated examples illustrate the present invention except the fired products produced at 500° C., 600° C., and 700° C. in Example 15 and Example 26.

A comparison of the examples illustrating the present invention shows that strength or modulus of rupture of the present fired products depends largely on the type of wollastonite particle used, i.e. size, size distribution and aspect ratio, the ratio of phosphoric acid to wollastonite, and firing temperature.

The fired products produced in Examples 10 through 12, i.e. 13 T bars, 2 liners and 6 dividers, were used in place of asbestos hardboard and alumina ceramic board in two arc circuit breakers. Arc testing of the arc breakers showed that the present fired products are satisfactory replacements in arc circuit breakers.

A comparison of Example 25, where 62 weight % $P_2O_5$ acid was used, with Example 20, where 70 weight % $P_2O_5$ acid was used, shows that a stronger fired product was produced with the more highly concentrated acid.

In Example 26, although the noncalcined wollastonite powder produced a fired product with an MOR of 2920 psi using a firing temperature of 800° C., it would produce a much weaker product than that produced by calcined wollastonite provided that all other parameters were equal.

The low modulus of rupture shown by the fired products in Example 15 is believed to be due largely to the non-uniformity of the mixture produced by hand mixing.

The examples show that the use of an ice bath is not necessary.

In Example 32, three of the molded green pieces were not dried and were fired at 800° C. producing fired products having an average MOR of 4811±psi as shown in the Table. This indicates that the pressed green piece need not be dried to produce the present fired product.

All of the fired products of the examples illustrating the present invention had a porosity less than 50% by volume, but greater than 10% by volume of the fired product.

In Example 34, the samples were tested immediately after molding to determine green strength and the average is given. In Example 35, the molded green piece was stored for 60 minutes in a glass desiccator with Drierite (anhydrous $CaSO_4$), then tested for strength. In Examples 36 and 37, the samples were tested immediately after warm molding. Examples 34-37 show the influence of molding temperature on green strength.

The fired product produced in Example 29 was metallographically prepared and is shown in the accompanying FIGURE. Dark areas of the FIGURE are either porosity or regions where some of the particles were pulled out during metallographic preparation. The light particles are mostly wollastonite and impregnating medium.

EXAMPLE 38

The fired products produced in Example 7 were used in this Example, i.e. the parts left after the MOR tests. The firing temperature in the following table was that used to prepare the fired products of Example 7. Prior to arc testing, Samples B, D and F were immersed in distilled water, boiled for two hours and then dried in air at 150° C. for 24 hours.

| Sample | Firing Temp. (°C.) | Boiling in $H_2O$ | Arc Resistance Test 12KV-40mA* | ASTM** |
|---|---|---|---|---|
| A | 600 | No | Passed | Passed |
| B | 600 | Yes | Passed | Not Tested |
| C | 700 | No | Passed | Passed |
| D | 700 | Yes | Passed | Not Tested |
| E | 800 | No | Passed | Passed |
| F | 800 | Yes | Passed | Not Tested |

*Arc test that involves the drawing of a 12KV 40mA arc, over the sample surface. Successful completion of the test is achieved if the sample maintains arc resistance for 400 seconds.
**Arc test described by ASTM standard D495.

All of the tabulated samples, i.e. Samples A through F, illustrate the present invention since they are shown to be useful as electrically insulating materials. Specifically, they show satisfactory resistance to an electrical arc. Samples B, D and F show that the arc resistance of the present fired product is not effected significantly by water.

EXAMPLE 39

A fired product was used which was produced in a manner substantially similar to that of Example 20 except that it differed in the mixing procedure. The fired product was crushed and subjected to Diffractometer X-ray Diffraction Analysis which showed it to be comprised of a major phase of $CaSiO_3$ (wollastonite), i.e. greater than 50% by volume, a minor phase of $\beta$-$Ca_2P_2O_7$, a minor phase of $\alpha$-cristobalite and a minor phase of diopside, $CaMgSi_2O_2$.

EXAMPLE 40

The fired products produced in Example 7 at 600° C. and at 800° C. were crushed and subjected to Diffractometer X-ray Diffraction Analysis.

The fired product produced at 600° C. showed roughly 7% by volume of $\beta$-$Ca_2P_2O_7$, roughly 4% by volume of $\alpha$-$SiO_2$, either a trace or no diopside, $CaMg(Si_2O_2)$ with the remainder being $CaSiO_3$ (wollastonite).

The fired product produced at 800° C. showed roughly 15% by volume of $\beta$-$Ca_2P_2O_7$, roughly 7% by volume of $\alpha$-$SiO_2$, either a trace or no $CaMg(Si_2O_2)$ with the remainder being $CaSiO_3$ (wollastonite).

The increase in amount of the two minor phases, $\beta$-$Ca_2P_2O_7$ and $\alpha$-$SiO_2$, indicates that reaction is greater at higher firing temperatures.

In addition, there are three very small unidentifiable diffraction lines at 3.42 Å, at 3.17 Å, and a 2.17 Å. The line at 2.17 Å is also present in the calcined wollastonite powder. The other two lines are not present in the calcined wollastonite powder and, therefore, indicate a trace amount of one or two additional phase or phases, believed to be a phosphate.

EXAMPLE 41

Two of the present fired products were examined with a mercury porosimeter to determine their porosity content.

A fired product, which was produced in a manner substantially similar to Example 20 except that it differed in the mixing procedure, showed that 22% by volume of the total volume of the product was porous.

The fired product produced in Example 2 showed that 28% by volume of the total volume of the product was porous.

EXAMPLE 42

Helium pycnometry showed that the crushed product of Example 29 had an apparent specific gravity of 2.8 to 2.9.

EXAMPLE 43

Wollastonite powder (W-10) was calcined in air at atmospheric pressure at 1000° C. for 60 minutes.

Phosphoric acid having a $P_2O_5$ concentration of 70% was admixed with the calcined powder to produce a uniform mixture comprised of 24% by weight of phosphoric acid and 76% by weight of calcined wollastonite.

The mixture was die-pressed at room temperature for 3 minutes under a pressure of 6000 psi. The resulting pressed piece had sufficient green strength to allow its removal from the press.

The pressed piece was fired in air at atmospheric pressure at a firing temperature of 500° C. for 2 hours.

The resulting fired product had a porosity of about 27% by volume.

The surface of the fired product was grey in color, probably due to a furnace effect, but the interior of the product was white in color. The fired product would be useful as a material in an arc breaker.

The fired product was crushed and examined by diffractometer X-ray diffraction analysis which showd that it was comprised mostly of wollastonite phase i.e. higher than about 80% by volume of the total volume of the solid portion of the product, and that it contained a small amount of $\alpha$-$SiO_2$, i.e. about 3% by volume of the total volume of the solid portion of the product. An extra diffraction line was observed at 3.235 Å indicating an unknown phase which was present in roughly about 5% by volume of the total volume of the solid portion of the product. Also observed was a trace of diopside which was probably about 2% by volume of the solid portion of the product. It is possible that a glassy phase was present in an amount of up to about 5% by volume of the solid portion of the product, but such phase is not detectable by this analysis, and generally, a glassy phase is very difficult to detect.

If desired, the fired products of the present invention can be ground or crushed in a conventional manner such as, for example, by means of a jaw crusher followed by crushing inside a tool steel die, to produce a particulate material or powder of any desired particle size and such particulate material or powder would be useful as an electrically insulating material.

What is claimed is:

1. A process of producing a polycrystalline ceramic which comprises calcining wollastonite powder to produce a calcined powder at least significantly free of calcite, forming a mixture comprised of from about 15% by weight to about 30% by weight of phosphoric acid and from about 70% by weight to about 85% by weight of said calcined wollastonite, said phosphoric acid ranging in concentration of $P_2O_5$ from about 61% by weight to about 76% by weight of the total weight of said acid, die-pressing the resulting mixture to impart at least sufficient green strength to the pressed piece to allow its removal from the press, and firing the pressed piece in air at or about atmospheric pressure at a firing temperature ranging from about 500° C. to about 900° C.

2. The process according to claim 1 wherein said mixture is comprised of about 24% by weight of phosphoric acid and about 76% by weight of said calcined wollastonite, and said phosphoric acid has a concentration of $P_2O_5$ of about 70% by weight of the total weight of said acid.

3. The process according to claim 1 wherein said firing temperature is about 800° C.

4. A molding composition for producing a pressed piece for producing a ceramic comprised of at least a significantly uniform mixture of from about 15% by weight to about 30% by weight of phosphoric acid and from about 70% by weight to about 85% by weight of calcined wollastonite, said phosphoric acid ranging in concentration of $P_2O_5$ from about 61% by weight to about 76% by weight of the total weight of said acid, said calcined wollastonite being at least significantly free of calcite.

5. A polycrystalline ceramic body comprised of a major phase of wollastonite and at least two minor phases, one of said minor phases being $\beta$-calcium pyrophosphate, the other of said minor phases being $\alpha$-cristobalite, said ceramic body having a porosity ranging from less than about 50% by volume to greater than about 10% by volume of the total volume of said ceramic body, said wollastonite phase being in the form of particles distributed throughout said body and being identifiable as calcium metasilicate, said wollastonite phase being present in an amount greater than 50% by volume but less than about 95% by volume of the total volume of the solid portion of said body, said $\beta$-calcium pyrophosphate minor phase being present in an amount less than about 40% by volume of the total volume of the solid portion of said body, said $\alpha$-cristobalite phase being present in an amount less than about 25% by volume of the total volume of the solid portion of said body.

6. The polycrystalline ceramic body according to claim 4 wherein said wollastonite particles are acicular in form.

7. A polycrystalline ceramic body comprised of wollastonite phase and $\alpha$-cristobalite phase, said ceramic body having a porosity ranging from less than about 50% by volume to greater than about 10% by volume of the total volume of said ceramic body, said wollastonite phase being in the form of particles distributed throughout said body and being identifiable as calcium metasilicate, said wollastonite phase being present in an amount greater than 70% by volume but less than about 98% by volume of the total volume of the solid portion of said body, said $\alpha$-cristobalite phase being present in an amount less than about 15% by volume of the total volume of the solid portion of said body.

8. The polycrystalline ceramic body according to claim 7 wherein said wollastonite particles are acicular in form.

9. A particulate material or powder comprised of a major phase of wollastonite and at least two minor phases, one of said minor phases being $\beta$-calcium pyrophosphate, the other of said minor phases being $\alpha$-cristobalite, said wollastonite phase being identifiable as calcium metasilicate, said wollastonite phase being present in an amount greater than 50% by volume but less than about 95% by volume of the total volume of said particulate material or powder, said $\beta$-calcium pyrophosphate minor phase being present in an amount less than about 40% by volume of the total volume of said particulate material or powder, said $\alpha$-cristobalite phase being present in an amount less than about 25% by volume of the total volume of said particulate material or powder.

10. A particulate material or powder comprised of wollastonite phase and $\alpha$-cristobalite phase, said wollastonite phase being identifiable as calcium metasilicate, said wollastonite phase being present in an amount greater than 70% by volume but less than about 98% by volume of the total volume of said particulate material or powder, said $\alpha$-cristobalite phase being present in an amount less than about 15% by volume of the total volume of said particulate material or powder.

* * * * *